US008875722B2

(12) United States Patent
Karlsen et al.

(10) Patent No.: US 8,875,722 B2
(45) Date of Patent: Nov. 4, 2014

(54) SELF PROPELLED CLEANING DEVICE FOR MARINE STREAMERS

(75) Inventors: Kenneth Karlsen, Aalesund (NO); Erling Vaageskar, Ulsteinvik (NO); Jon Tore Saetre, Nordfjordeid (NO); Anders Brevik, Oslo (NO); Peter Magnus Skarbø, Oslo (NO); Øyvind Overskeid, Langhus (NO)

(73) Assignee: PGS Geophysical AS, Oslo (NO)

( * ) Notice: Subject to any disclaimer, the term of this patent is extended or adjusted under 35 U.S.C. 154(b) by 708 days.

(21) Appl. No.: 12/932,639

(22) Filed: Mar. 2, 2011

(65) Prior Publication Data

US 2012/0222709 A1   Sep. 6, 2012

(51) Int. Cl.
  *B08B 3/00* (2006.01)
  *G01V 13/00* (2006.01)
  *G01V 1/38* (2006.01)
  *B08B 9/023* (2006.01)
(52) U.S. Cl.
  CPC .............. *G01V 13/00* (2013.01); *G01V 1/3808* (2013.01); *B08B 9/023* (2013.01)
  USPC ....................................................... 134/141
(58) Field of Classification Search
  CPC ........................................................ B08B 3/02
  See application file for complete search history.

(56) References Cited

U.S. PATENT DOCUMENTS

| 5,005,245 | A | 4/1991 | Dooley et al. |
| 7,145,833 | B1 | 12/2006 | Hoogeveen |
| 7,376,045 | B2 | 5/2008 | Falkenberg et al. |
| 7,409,919 | B2 | 8/2008 | Hoogeveen et al. |
| 7,800,976 | B2 | 9/2010 | Stokkeland et al. |
| 2008/0127875 | A1* | 6/2008 | Hoogeveen et al. .......... 114/312 |
| 2009/0217946 | A1 | 9/2009 | Anthony |
| 2011/0197919 | A1 | 8/2011 | Tilley |

FOREIGN PATENT DOCUMENTS

| FR | 2847947 A1 | 6/2004 |
| GB | 2411197 | 8/2005 |
| GB | 2444604 | 6/2008 |
| WO | WO 2012/039625 | 3/2012 |

OTHER PUBLICATIONS

United Kingdom Novelty Search Report, date: Jun. 12, 2012.
Translation of Search Report and Written Opinion, French Patent Application No. 12 51747.

* cited by examiner

*Primary Examiner* — Jason Ko

(57) ABSTRACT

A streamer cleaning device includes a plurality of cleaning modules affixed to a main frame in angularly spaced apart orientation. At least one cleaning module includes a drive wheel rotationally coupled to a cleaning element. At least one cleaning module includes a guide mounted thereon. The guide is configured to deflect devices mounted on the streamer out of a path traversed by the cleaning modules. At least one of the cleaning modules comprises a device for conversion of motion of water past the at least one cleaning module into rotational energy to drive the drive wheel thereon.

12 Claims, 10 Drawing Sheets

SELF PROPELLED CLEANING DEVICE FOR MARINE STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Marine streamers, such as geophysical sensor streamers are essentially long cables that extend behind a geophysical survey vessel or another vessel in a body of water. Streamers are subject to accumulation of debris, and depending on the deployment time, can accumulate marine organisms, e.g., barnacles, on the exterior. Such accumulations can increase drag on the streamers as they are towed through the water, making towing more difficult and expensive, and subjecting the streamers to malfunction or breakage. Streamers known in the art include various navigation devices along their length. Such devices may include lateral force and depth control devices (LFD), and "pingers" forming part of an acoustic range detection system. There exists a need for a streamer cleaning device that can traverse an entire deployed streamer wherein the streamer includes such LFD and other devices.

DETAILED DESCRIPTION

Figure 1:
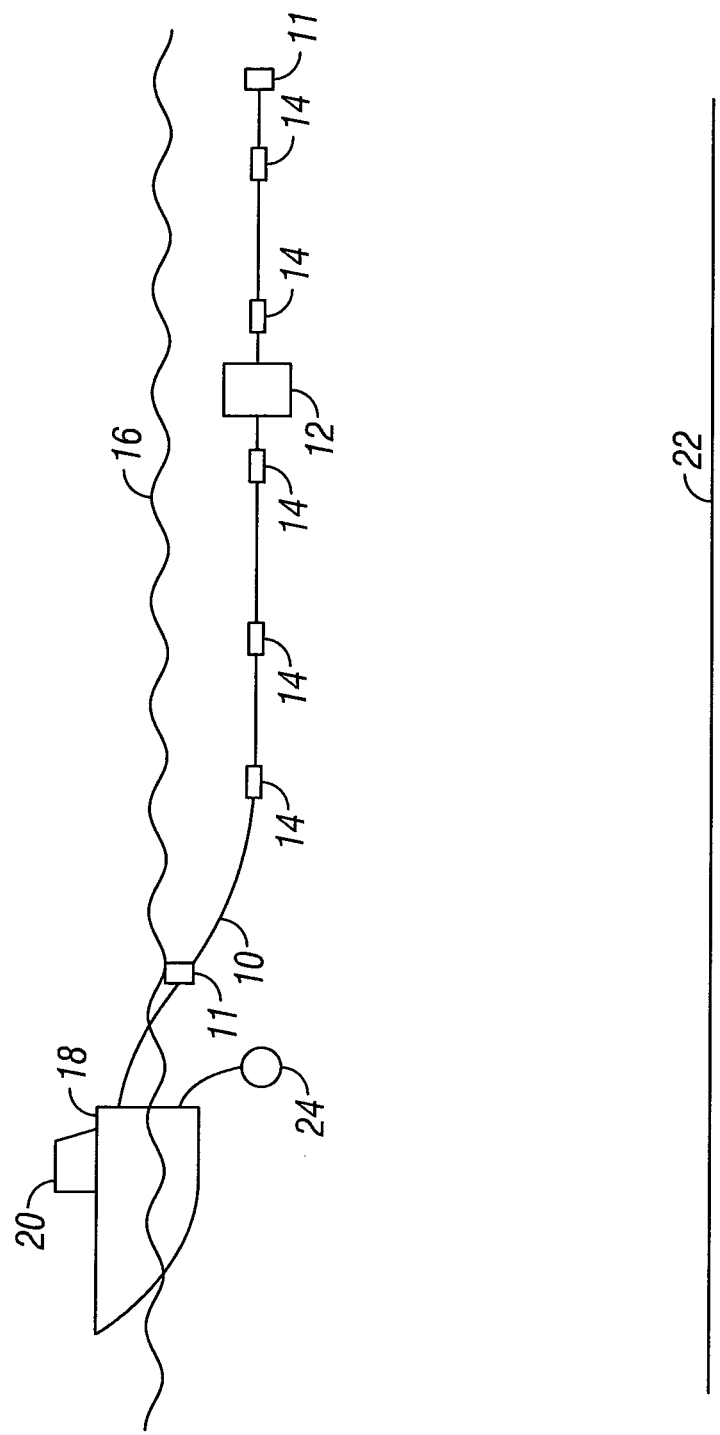
FIG. 1 shows an example embodiment of a streamer cleaning device being used on a marine geophysical sensor streamer.

FIG. 1 shows an automatic seismic streamer cleaning device (hereinafter "cleaning device") as it is typically used on a marine geophysical survey streamer, such as a seismic streamer or electromagnetic sensor streamer. A survey vessel 18 (hereinafter "vessel") tows a marine survey sensor streamer 10 (hereinafter "streamer") near the surface of a body of water 16. For purposes of familiarization, the vessel 18 may include thereon various seismic and/or other geophysical data acquisition, data recording and navigation equipment, shown generally at 20 and collectively referred to as a "recording system", which controls operation of a geophysical energy source 24 such as a seismic source array or an electromagnetic transmitter, and records signals detected by various sensors (not shown) disposed in the streamer 10. Energy emitted by the source 24 is reflected by various structures (not shown) below the bottom 22 of the body of water 16. Such reflected energy is ultimately detected by the sensors (not shown) on the streamer 10 for recording by the recording system 20. The example implementation shown in FIG. 1 includes only one streamer, however it is known in the art for a single vessel to tow a plurality of streamers at laterally spaced apart positions and/or vertically spaced apart positions behind the seismic vessel or another vessel. Accordingly, the actual configuration of vessels and streamers is not a limitation on the scope of the invention.

As is known in the art, the streamer 10 typically includes an outer, generally cylindrically shaped jacket which may be made from a flexible, acoustically transparent material such as polyurethane. Inside the jacket, the streamer 10 may include one or more strength members (not shown separately). One or more flotation or buoyancy spacers (not shown separately) may be disposed inside the jacket, which may provide the streamer 10 with a selected degree of buoyancy in the water 16. Some of the spacers (not shown) may include therein the one or more geophysical sensors (not shown) and which may be hydrophones, geophones, electrodes, magnetometers or any other sensing device used to detect energy originating from the source 24. In a typical streamer, the foregoing components extend for a selected length, usually about 75 meters, in a so called "segment." Each such segment may be terminated at each axial end thereof with some form of connector that has substantially the same outer diameter as the jacket. A streamer may be thus formed from as many as 100 or more such interconnected segments. Thus, the majority of the length of the streamer 10 presents a substantially constant diameter, generally cylindrical exterior surface for application of various devices, including a cleaning device 12 according to the various aspects of the invention. In some embodiments, the streamer 10 may include a stop 11 disposed at selected positions along the streamer 10 where motion of the cleaning device 12 is to be stopped or reversed during ordinary operation. The stops 11 may be configured to cooperatively act with certain features, to be explained further below, to cause motion of the cleaning device 12 to reverse along the streamer 10.

The present embodiment of the streamer 10 may include one or more lateral force and direction control devices, shown generally at 14 and explained in more detail below. The LFD devices 14 are used to steer the streamer 10 so that it follows a selected geodetic path through the water. The LFD devices 14 generally include a plurality of control surfaces (explained further below) that extend laterally outward from the streamer 10. As will be further explained, the cleaning device according to various aspects of the invention is configured to be able to traverse the entire streamer 10, from the forward stop 11 to the aft stop 11 even with the presence of the LFD devices 14, and the presence of other devices or objects to be further describe herein.

Figure 2:
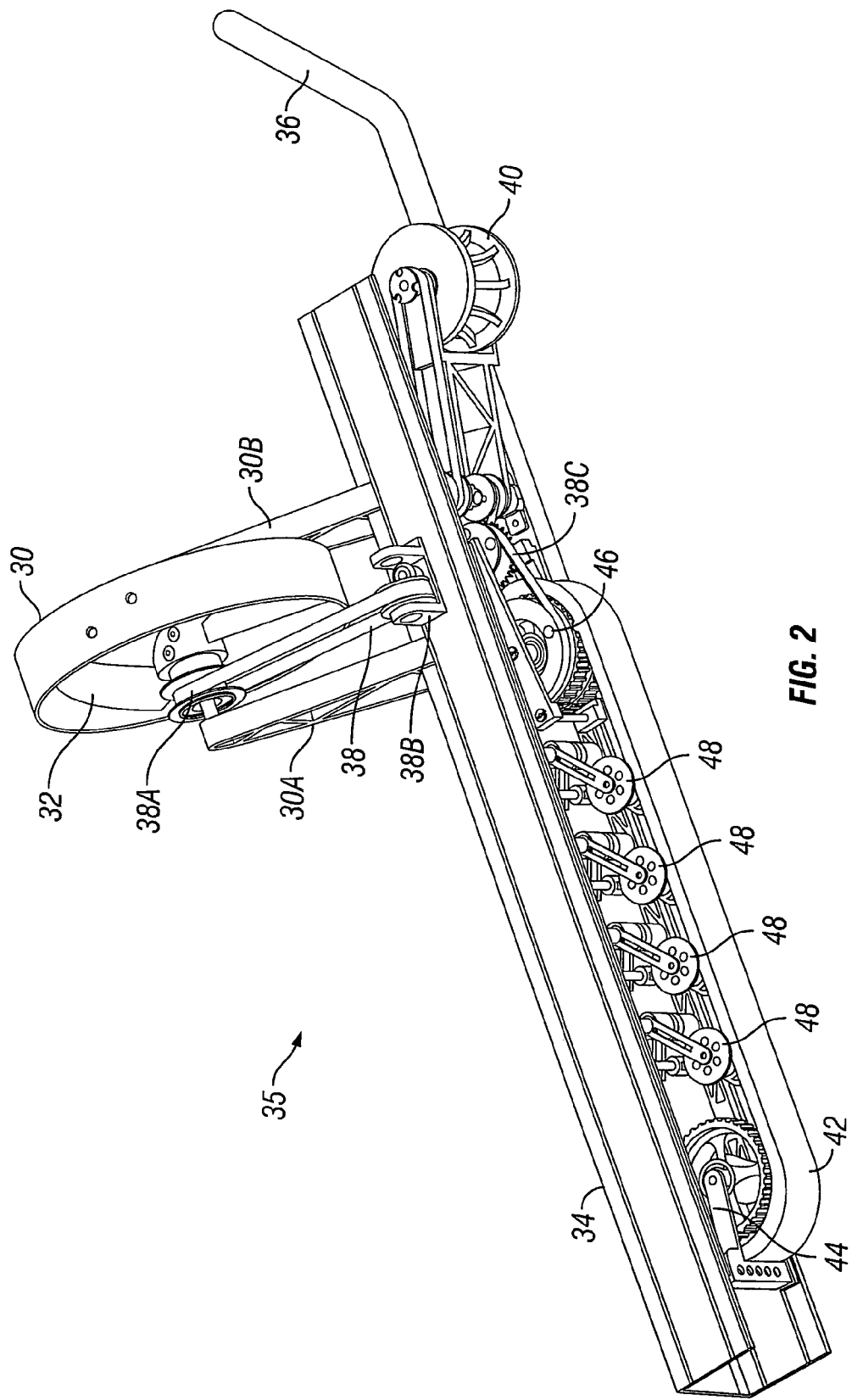
FIG. 2 shows an example embodiment of a cleaning device module.

The present embodiment of the cleaning device 12 may be made in modular form to simplify construction and maintenance. Cleaning elements (explained below) contact the streamer exterior and remove debris from the exterior of the streamer. The cleaning elements (explained below) may be mounted in cleaning modules ("modules"). In the present embodiment, there may be two types of modules, self-propelled and passively propelled. FIG. 2 shows an example of a self-propelled module 35. Components of the self-propelled module 35 may be affixed to a frame 34 which may be made from steel or other high strength material. The present embodiment may include bearing supports 30A, 30B extending outwardly from the frame 34. The bearing supports 30A, 30B may rotationally support a turbine 32. The turbine 32 may be protected by an outer cover ring 30. The turbine 32 is configured to convert motion of water therethrough into rotational energy as the streamer (10 in FIG. 1) is towed through the water (16 in FIG. 1).

Rotational motion of the turbine 32 may be transferred through, for example, pulleys 38A, 38B and a drive belt 38 to a tractor system disposed in the frame 34. The tractor system may include a main drive wheel 46 and an idler wheel 44 disposed at the longitudinal ends of a tractor belt 42. The main drive wheel 46 wheel may obtain rotational energy from a gear and belt combination 38C rotationally coupled to one of the pulleys 38B. The tractor belt 42 may be configured to come into frictional contact with the exterior of the streamer (10 in FIG. 1) so as to move the self-propelled module 35 along the exterior of the streamer (10 in FIG. 1). There may be one or more tractor belt guide wheels 48 disposed longitudinally between the main drive wheel 46 and the idler wheel 44. The tractor belt guide wheels 48, as well as the main drive wheel 46 and the idler wheel 44, may be spring loaded or otherwise bias mounted to the frame 34 to urge the tractor belt 42 into contact with the exterior of the streamer (10 in FIG. 1) along substantially the entire length of the tractor belt 42. In other embodiments, the tractor belt 42 may be omitted, and the main drive wheel 46, and any idler wheel 44 and guide wheels 48 may directly contact the exterior of the streamer (10 in FIG. 1).

Rotational energy from the gear and belt combination 38C may also be communicated to a cleaning element 40 through another pulley and belt combination 40A. The cleaning element 40 may be generally configured to contact a selected portion of the circumference of the streamer (10 in FIG. 1) and may include such devices as scrapers and/or brushes such that rotational motion of the cleaning element 40 can remove barnacles and other debris from the exterior of the streamer (10 in FIG. 1) as the cleaning device (12 in FIG. 1) moves along the streamer (10 in FIG. 1). The cleaning element 40 may also be spring loaded or otherwise bias mounted to the frame 34 to contact the exterior of the streamer. Other example embodiments of the self-propelled module 35 are described, for example in U.S. Pat. No. 7,409,919 issued to Hoogeveen et al. and incorporated herein by reference. In some embodiments, there may be more than one cleaning element 40 in each module.

The self-propelled module 35 may also include a guide 36 on one or both longitudinal ends coupled to the frame 34. The guide(s) 36 cooperate(s) with similar guides on other modules forming the cleaning device (12 in FIG. 1) to rotate the cleaning device (12 in FIG. 1), the streamer (10 in FIG. 1) or a device mounted on the streamer relative to each other such that the cleaning device (12 in FIG. 1) may freely pass such devices on the streamer exterior. The devices may include, without limitation the LFD devices described with reference to FIG. 1 and other devices to be described in more detail below.

Figure 3:
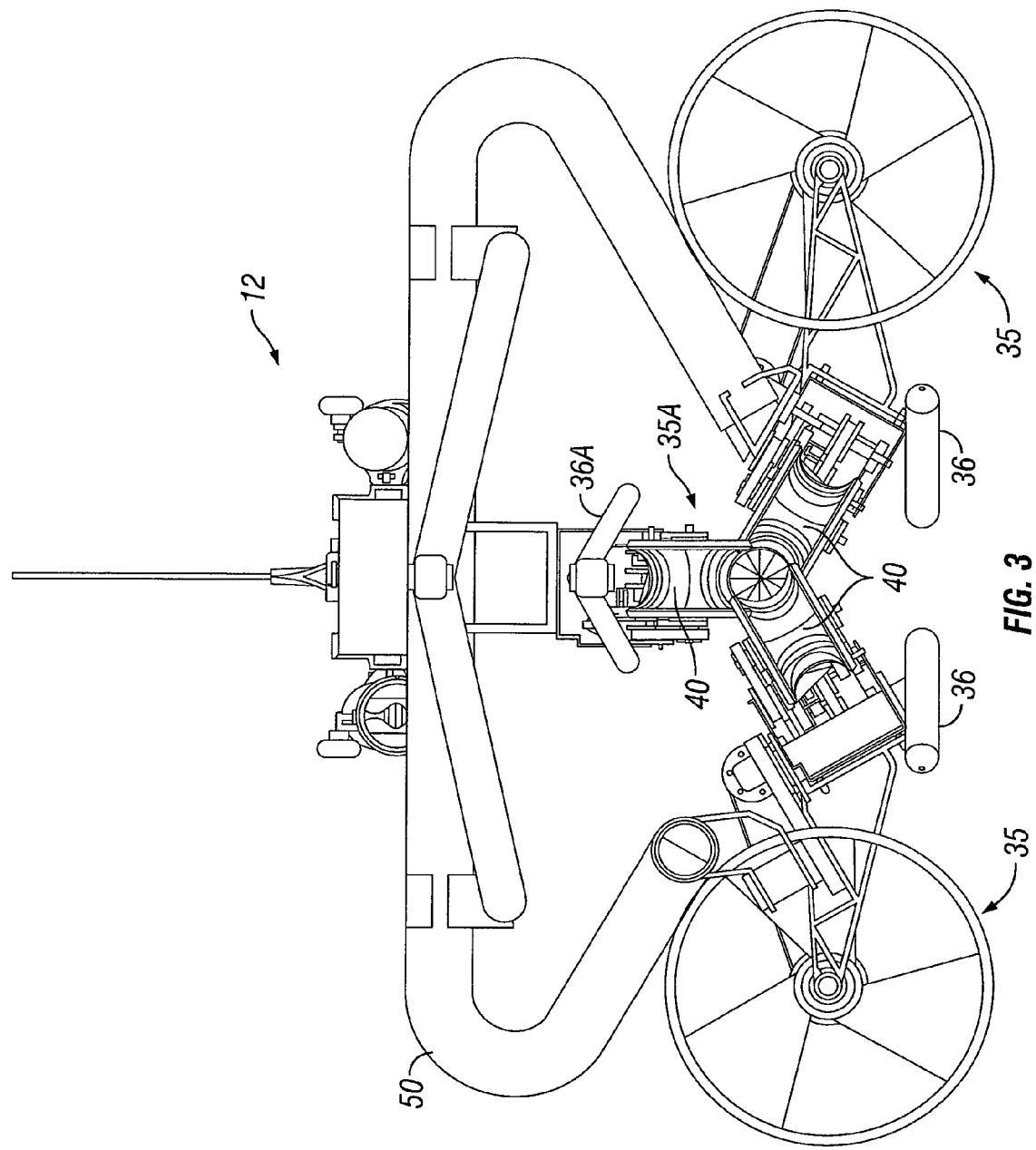
FIG. 3 shows an end view of an example embodiment of a streamer cleaning device.

FIG. 3 shows an end view of an example embodiment of a cleaning device 12. Cleaning device 12 may include two of the self-propelled modules 35 described with reference to FIG. 2, and a passive module 35A. Other embodiments may include only one self-propelled module 35, so the example cleaning device structure shown in FIG. 3 is not intended to limit the scope of the present invention. The modules 35, 35A may be coupled to a main frame (described below).

The passive module 35A may be similar in configuration to the self propelled modules 35 described with reference to FIG. 2 and include most of the same components therein, however, the passive module 35A may exclude the turbine (32 in FIG. 2) and associated components used to transfer rotational energy therefrom to the tractor belt (42 in FIG. 2) and cleaning element (40 in FIG. 2) as used in the self-propelled modules 35. Thus, the passive module 35A may be moved by the energy supplied by the one or two self-propelled modules 35 transferred through the main frame (described below). The tractor belt (42 in FIG. 2) on the passive module 35 may be rotationally coupled to one or more cleaning elements (40 in FIG. 2) such that longitudinal motion of the passive module 35A along the streamer will result in rotation of its cleaning element(s). The tractor belt on the passive module 35A may include bias mounted idler wheels at both ends thereof and one or more bias mounted guide wheels along the length thereof. The passive module 35A may include a guide nose 36A at one or both longitudinal ends which may cooperate with the guides 36 on the self-propelled modules 35, or act on its own to navigate around certain components affixed to or mounted on the streamer, as will be further explained below. The tractor belt in the passive module may be supported at its longitudinal ends by idler wheels similar to the idler wheel and drive wheel shown in FIG. 2. For definitional purposes, in both the self-propelled module and the passive module, such wheels may be defined as "end wheels." Similar to the structure of the self-propelled modules, the passive module's tractor belt (42 in FIG. 2) may be supported along its length by one or more guide wheels.

It will be appreciated by those skilled in the art that transfer of rotational motion of the main drive wheel in each of the modules to the cleaning element, and in the self-propelled modules transfer of rotational motion of the turbine to the main drive wheel may also be performed by suitably arranged gears. The pulleys and belts as explained above represent only one example of rotational motion transfer devices. Other arrangements of devices for transferring rotational motion will occur to those skilled in the art having the benefit of the present disclosure.

All three modules 35, 35A may be mounted to a main frame 50 such as may be made from carbon fiber tubing or similar material. The modules 35, 35A may be mounted to the main frame 50 so that they are substantially equally angularly spaced around the exterior of the streamer (10 in FIG. 1), and the respective tractor belts and cleaning elements thereof are oriented radially inwardly. The streamer (10 in FIG. 1) will thus move relative to the cleaning device (12 in FIG. 1) through a roughly circular opening defined by the respective cleaning elements 40 on each module 35, 35A.

Figure 4:
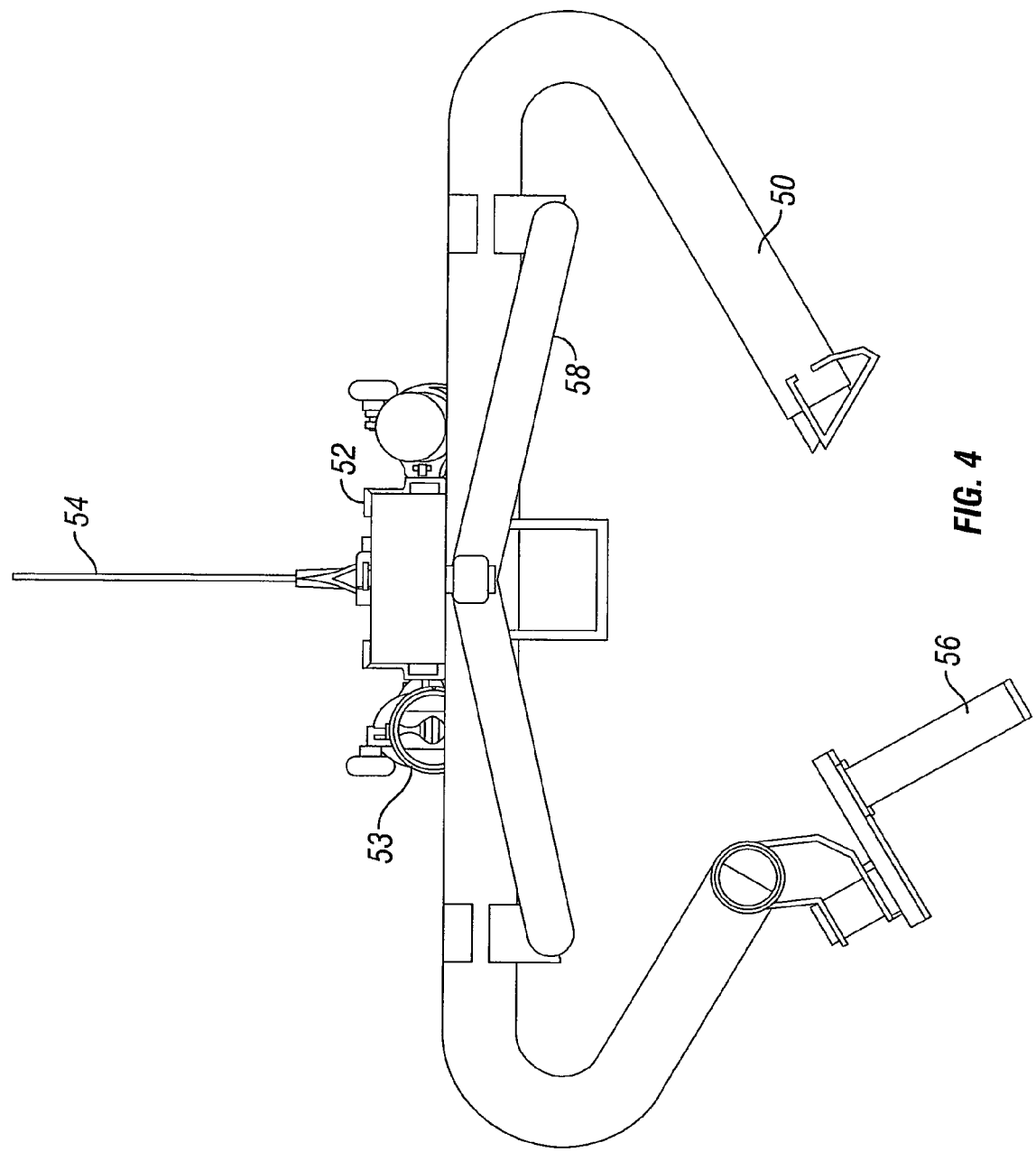
FIG. 4 shows a main frame component of an example embodiment of a streamer cleaning device.

FIG. 4 shows some of the details of an example embodiment of a main frame 50. The main frame 50 may include a buoyancy device 52 such as a float to keep the main frame 50 oriented generally in one rotational orientation and/or to provide buoyant force selected to cause cleaning device (12 in FIG. 1) to be substantially neutrally buoyant overall. By having the cleaning device be substantially neutrally buoyant, the streamer depth will not be substantially affected as the cleaning device (12 in FIG. 1) moves along the streamer (10 in FIG. 1). The main frame 50 may include containers 53 mounted thereto for housing electronic devices such as sensors, cameras or other devices to assist the user in determining the operating status of the cleaning device. Such electronic devices may communicate with the recording system (20 in FIG. 1), for example, using radio communication. In such embodiments, a radio antenna 54 may be affixed to the float 52 or other convenient device. The main frame 50 may include a device for reducing turbulence (not shown) as the cleaning device (12 in FIG. 1) moves through the water. An alignment device, shown at 58, may be included on the main frame 50 to assist alignment of spaces between the modules to enable the cleaning device to freely pass over objects on the exterior of the streamer, as will be further explained below.

In the present embodiment, one of the self propelled modules 35 may be coupled to the main frame 50 by a locking handle and pivot combination 56. The locking handle and pivot combination 56 may be rotated, such as by hand, to move the self-propelled module 35 affixed to it laterally away from the other two modules 35, 35A. Such movement may provide sufficient opening to enable placement of the cleaning device (12 in FIG. 1) on the streamer (10 in FIG. 1) at any selected longitudinal position. Once the cleaning device (12 in FIG. 1) is suspended on the streamer, the locking handle and pivot combination 56 may be rotated to move the affixed self-propelled module inward such that the relative positions of the three modules are substantially as shown in FIG. 3. The foregoing procedure will be shown in more detail and explained with reference to FIGS. 9 and 10.

Figure 5:
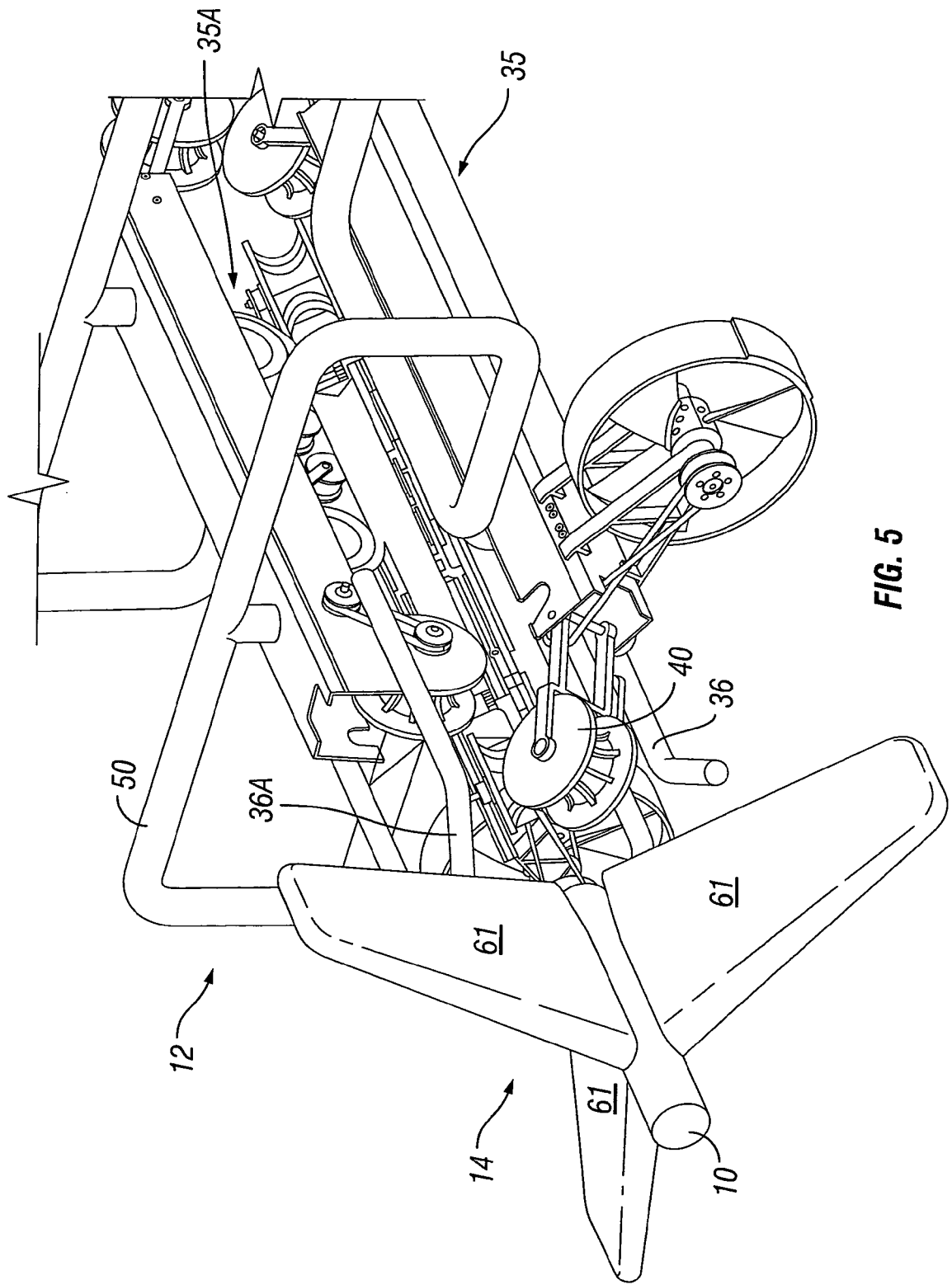
FIG. 5 shows an example embodiment of a streamer cleaning device approaching a lateral force and depth control (LFD) device on a streamer.

FIG. 5 shows an example embodiment of cleaning device 12 as it approaches an LFD device 14 on the streamer 10. The LFD device shown in FIG. 5 may include three, substantially equally angularly spaced control surfaces 61. The control surfaces 61 may be rotated about an axis perpendicular to the streamer axis to cause the streamer 10 to move in a selected direction. The control surfaces 61 may be mounted to the LFD device such that all the control surfaces can rotate relative to the streamer about the longitudinal axis of the streamer. Such operation of the control surfaces is described, for example and without limitation, in U.S. Pat. No. 7,800,976 issued to Fokkeland et al. and incorporated herein by reference. In the present embodiment, as the cleaning device 12 approaches the LFD device 14, the guide nose 36A on the passive module 35A, and the respective guides 36 on the self-propelled modules 35 cooperate with the control surfaces 61 to cause the LFD device 14 and cleaning device (12 in FIG. 1) to rotate about the streamer 10. In the event the LFD device 14 does not have control surfaces 61 that are rotatable about the longitudinal axis if the streamer 10, the streamer 10 is typically sufficiently torsionally flexible to enable sufficient relative rotation of the control surfaces 61 with respect to the cleaning device 12. In either case, such relative rotation may enable the control surfaces 61 to pass through the circumferential or angular spaces between the modules 35, 35A. The shape of the main frame 50 may be such that the control surfaces 61 may pass through suitable spaces (see FIG. 6) formed therein.

Figure 6:
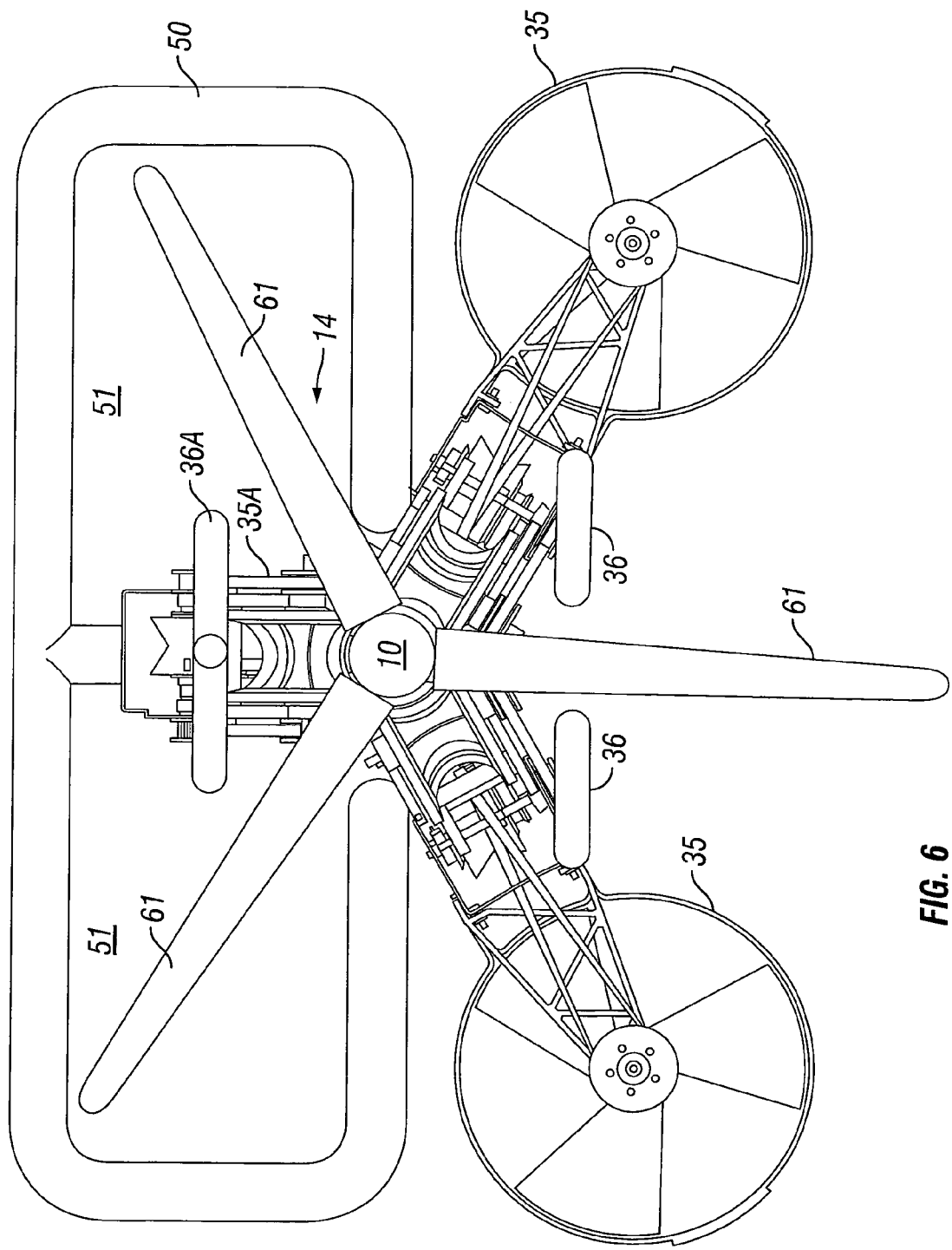
FIG. 6 shows an end view of an example embodiment of the streamer cleaning device passing over the LFD device shown in FIG. 5.

FIG. 6 shows an end view of cleaning device 12 as it is passing over the LFD device 14. The LFD device 14 and/or the streamer 10 has been rotated by cooperation of the control surfaces 61 with the guide nose 36A on the passive module 35A and the guides 36 on the self-propelled modules 35 so that the control surfaces 61 may be oriented into the spaces between the modules 35, 35A and spaces 51 in the structure of the main frame 50. Such orientation may enable the cleaning device 12 to freely pass by the LFD device 14.

Figure 7:
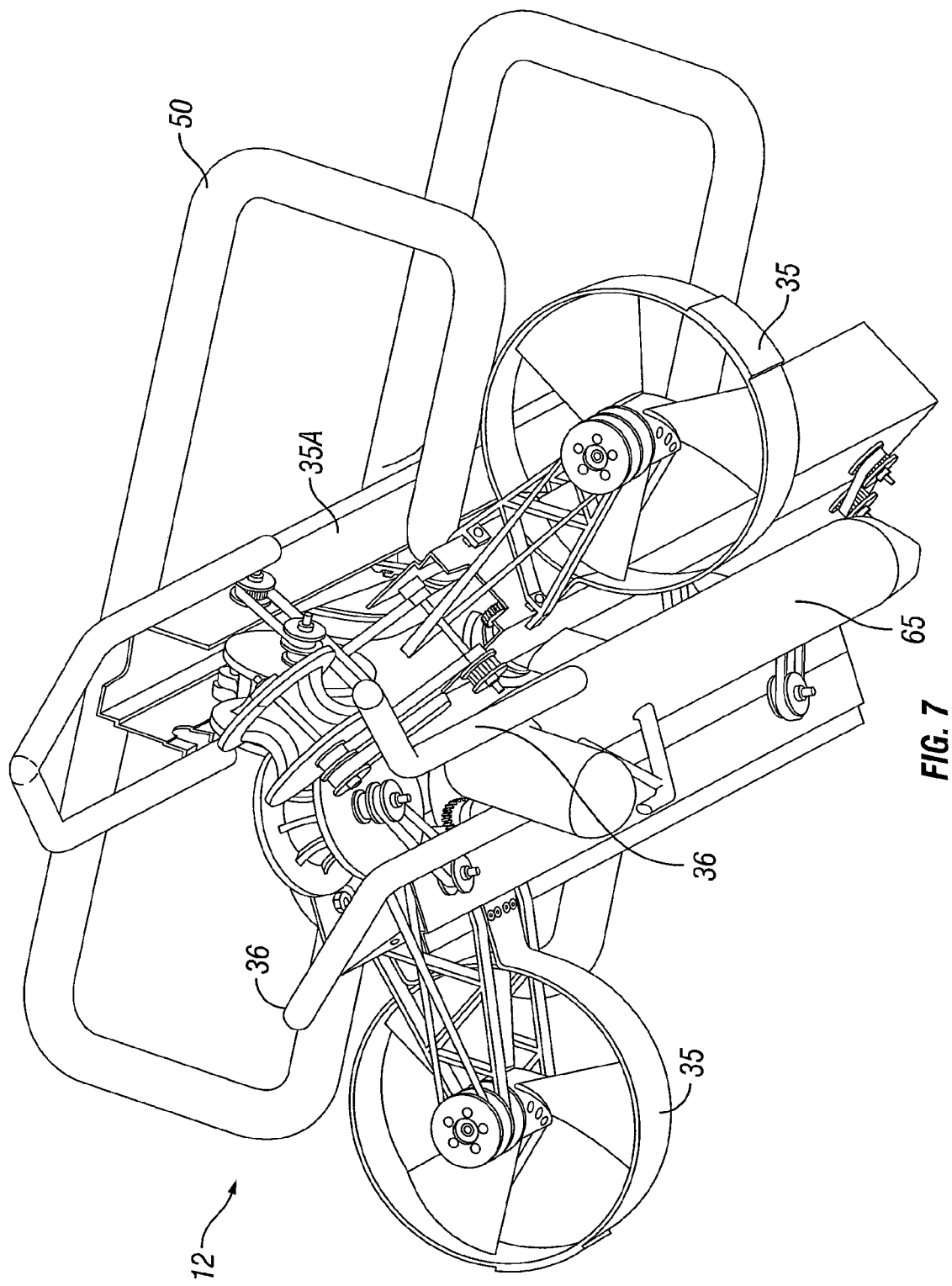
FIG. 7 shows an oblique view of an example embodiment of the streamer cleaning device passing over an acoustic streamer position locating device.

FIG. 7 shows an oblique view of cleaning device passing over an acoustic streamer position location device ("pinger") 65. Pingers such as the one shown in FIG. 7 may be positioned at selected longitudinal locations along the streamer (omitted from FIG. 7 for clarity) and may be used to assist in determining the geodetic position of the streamer when used in a multiple streamer array. An example of such a pinger system is more fully described in U.S. Pat. No. 7,376,045 issued to Falkenberg et al. Typically the pinger 65 is oriented downwardly and extends from the bottom of the streamer. The shape of the pinger 65 cooperates with the respective guide 36 on each self-propelled module 35 such that the pinger 65 remains oriented in the circumferential or angular space between the two self-propelled modules 35. Any contact between components of the self-propelled modules 35, for example, the cleaning elements (40 in FIG. 2) or the tractor belt (42 in FIG. 2) and the pinger 65 may be dealt with readily if the respective components are spring loaded or otherwise bias mounted to the module's frame (34 in FIG. 2) as explained with reference to FIG. 2.

Figure 8:
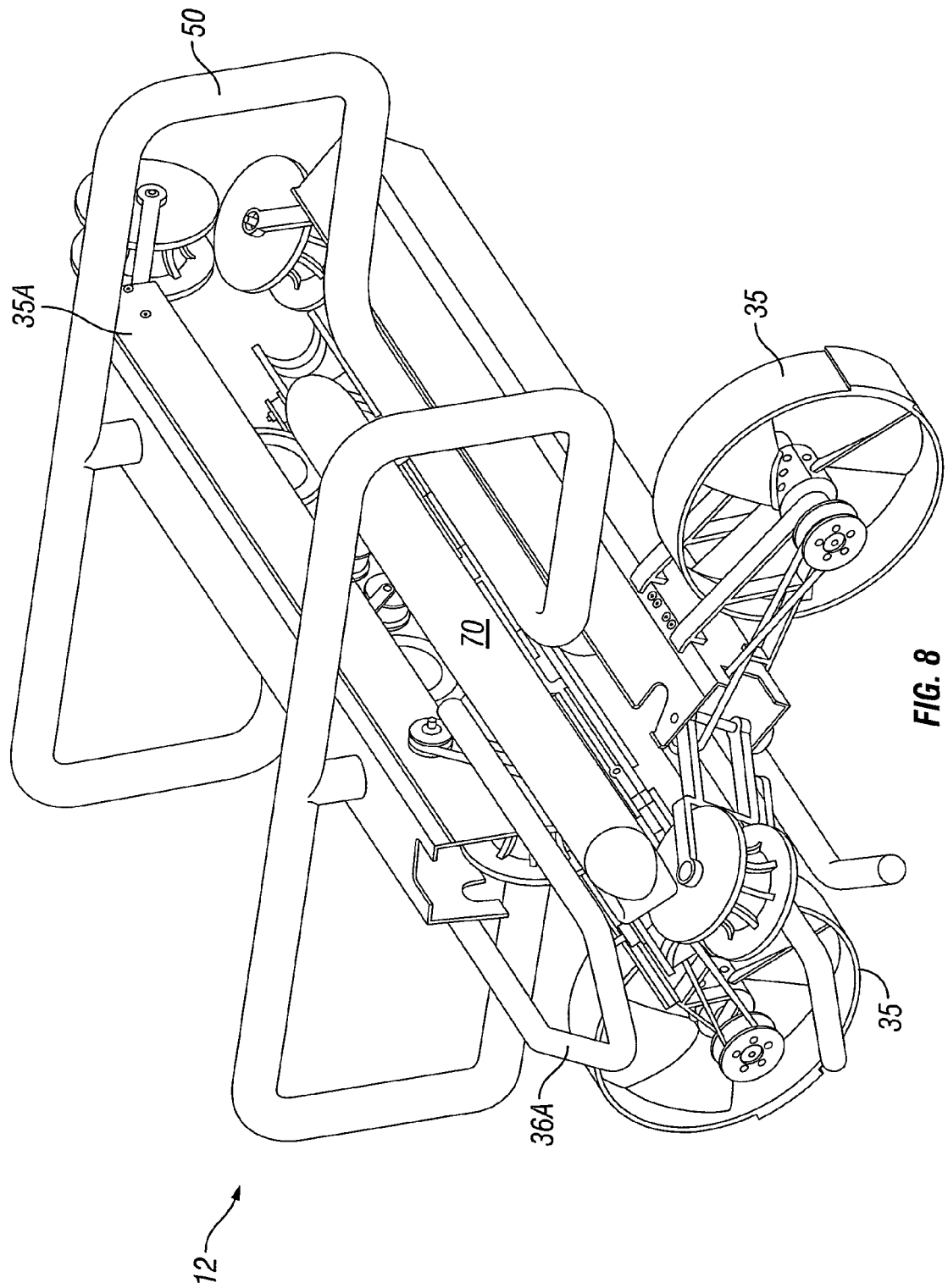
FIG. 8 shows an oblique view of an example embodiment of the streamer cleaning device passing over any device mounted to the streamer above the horizontal plane.

FIG. 8 shows an oblique view of an example embodiment of cleaning device 12 passing over a device 70 affixed to the streamer (not shown for clarity) above the streamer's horizontal plane. The device may be any device so affixable to the streamer including, without limitation, geomagnetic orientation devices ("compass birds"), streamer lifting devices and the like. The guide nose 36A on the passive module 35A may move the device 70 so that it travels within the angular or circumferential space between the passive module 35A and either self-propelled module 35 and in either of the spaces (51 in FIG. 6) provided by the shape of the main frame 50.

It will be appreciated by those skilled in the art that the number of modules, both self-propelled and passive, and the angular spacing therebetween may be different in other embodiments. The number and type of modules and their positioning with respect to the circumference of the streamer in other embodiments may depend on the types and positions of devices affixed to the streamer. It should also be understood that the cleaning device will operate for some configurations of objects on the streamer with only one of the cleaning modules including a guide, or any other number of cleaning modules less than the full number thereof including a guide.

Figure 9:
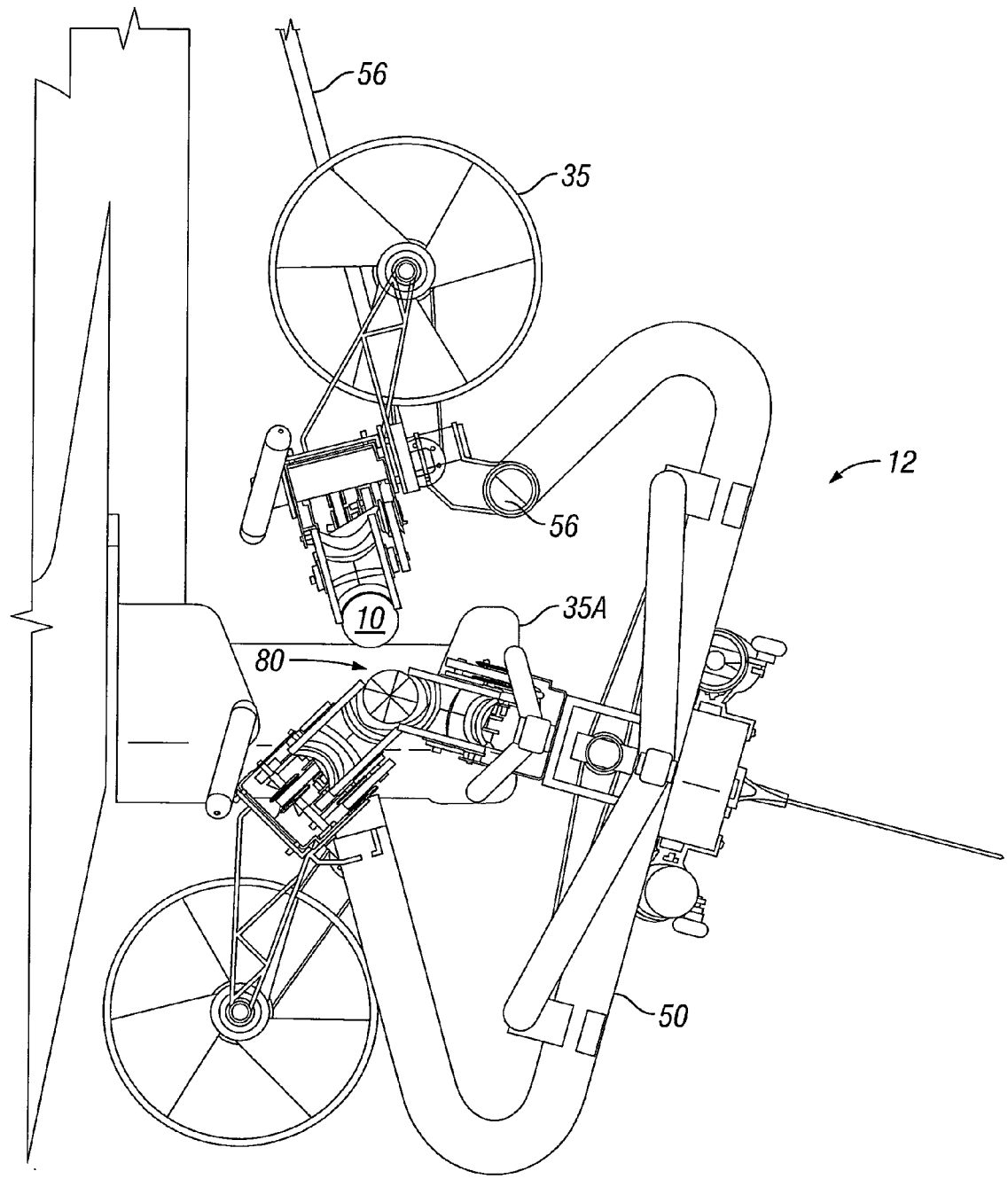
FIG. 9 shows an example embodiment of the streamer cleaning device being assembled to a streamer.
Figure 10:
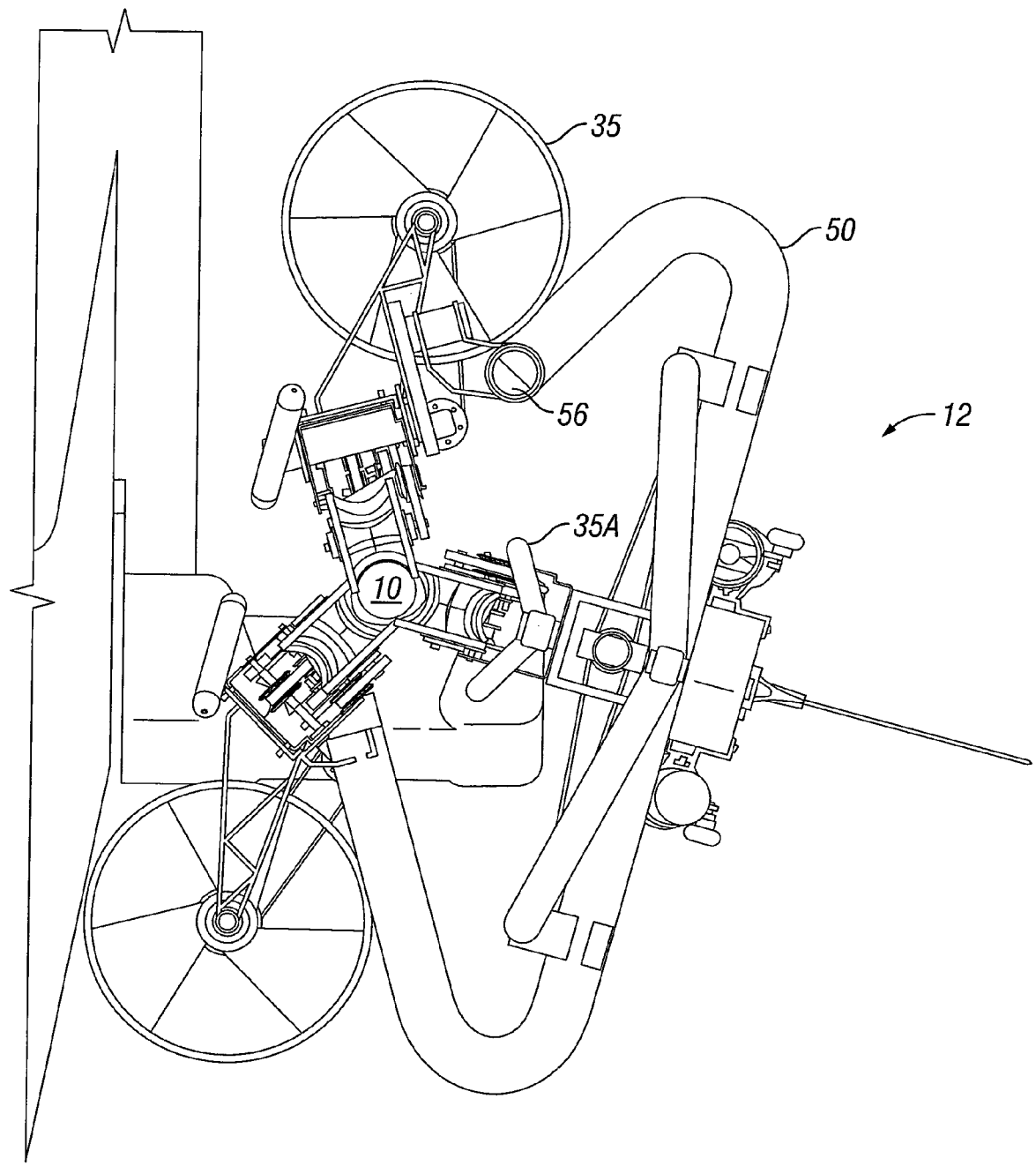
FIG. 10 shows the assembly procedure of FIG. 9 after operating a locking handle and pivot combination.

As previously explained with reference to FIG. 4, a locking handle and pivot combination (56 in FIG. 4) may be used to facilitate assembly of the cleaning device to a streamer and its removal therefrom. FIG. 9 shows an end view of an example embodiment of the cleaning device 12 being assembled to a streamer 10. The locking handle and pivot combination 56 may be used to movably mount one of the self-propelled modules 35 (the "movable module") to the main frame 50 as previously explained. In FIG. 9, the locking handle and pivot combination 56 are shown in the opened position, such that the attached self-propelled module 35 is moved laterally away from the other modules 35, 35A. Such movement creates an opening 80 between the parts of the modules 35, 35A that contact the streamer 10. Thus, the cleaning device 12 may be moved over the streamer 10 by passing it through the opening 80. The cleaning device 12 may be suspended from the movable module. Subsequent to suspending the movable module from the streamer 10, and referring to FIG. 10, the locking handle and pivot combination 56 may be operated to move the movable module laterally toward the other two modules 35, 35A, thus locking the cleaning device 12 to the streamer 10. Removing the cleaning device 12 from the streamer 10 may include reversing the foregoing procedure.

In some embodiments, the cleaning device may include components to cause automatic reverse of motion along the streamer. Examples of such devices are more fully described in U.S. Pat. No. 7,409,919 issued to Hoogeveen et al. and incorporated herein by reference.

A cleaning device according to the various aspects of the invention may provide better cleaning capability, and may provide better capability to move along a streamer wherein one or more types of device having diametrically large features are disposed in the streamer. The cleaning device described herein is applicable to any type of marine streamer, including geophysical sensor streamers such as seismic streamers and electromagnetic sensor streamers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A streamer cleaning device, comprising:
a plurality of cleaning modules affixed to a main frame in angularly spaced apart orientation, each cleaning module including a main drive wheel rotationally coupled to a cleaning element, at least one cleaning module including a guide mounted thereon, the guide having a surface not parallel to a length of the streamer and configured to cooperate with a corresponding surface on a guide on at least one other cleaning module to urge rotation of the cleaning device so that an apparatus protruding from the streamer are able to pass through a space between the guides on deflect devices mounted on the streamer out of a path traversed by the cleaning modules along the streamer; and
wherein at least one of the cleaning modules comprises a device for conversion of motion of water past the at least one cleaning module into rotational energy to drive the drive wheel thereon.

2. The streamer cleaning device of claim 1 wherein each module comprises a bias mounted idler wheel and at least one bias mounted guide wheel.

3. The streamer cleaning device of claim 2 further comprising a tractor belt surrounding the main drive wheel, the bias mounted idler wheel and the at least one bias mounted guide wheel.

4. The streamer cleaning device of claim 1 wherein the device for conversion of motion comprises a turbine and pulley and belt system.

5. The streamer cleaning device of claim 1 wherein three cleaning modules are mounted to the main frame in substantially equally angularly spaced apart orientations.

6. The streamer cleaning device of claim 1 further comprising a buoyancy device coupled to the main frame.

7. The streamer cleaning device of claim 6 wherein the buoyancy device is configured such that the streamer cleaning device is substantially neutrally buoyant in water.

8. The streamer cleaning device of claim 1 wherein one of the cleaning modules is affixed to the main frame with a locking handle and pivot combination, the locking handle and pivot combination configured to move the one of the cleaning modules affixed thereto laterally away from the other cleaning modules.

9. The streamer cleaning device of claim 1 wherein each of the cleaning modules includes a guide thereon.

10. The streamer cleaning device of claim 1 wherein the apparatus protruding from the streamer is affixed thereto.

11. The streamer cleaning device of claim 10 wherein the apparatus protruding from the streamer comprises a lateral force and depth control device.

12. The steamer cleaning device of claim 10 wherein the apparatus protruding from the streamer comprises a pinger.

* * * * *